United States Patent

Cordell et al.

[11] Patent Number: 5,845,084
[45] Date of Patent: Dec. 1, 1998

[54] AUTOMATIC DATA DISPLAY FORMATTING WITH A NETWORKING APPLICATION

[75] Inventors: John P. Cordell, Bellevue; Benjamin W. Slivka, Clyde Hill; Christopher M. Franklin, Bellevue, all of Wash.; Arthur E. Blume, Albuquerque, N. Mex.; Bharat Shyam, Redmond, Wash.

[73] Assignee: Microsoft Corporation, Redmond, Wash.

[21] Appl. No.: 634,407

[22] Filed: Apr. 18, 1996

[51] Int. Cl.[6] ............................. G06F 13/14; G06F 13/00
[52] U.S. Cl. ............................. 395/200.64; 395/200.62; 395/710; 345/121; 345/123; 345/127
[58] Field of Search .................... 395/114, 821, 395/872, 200.64, 200.62, 710; 345/121, 123, 127; 358/448, 451

[56] References Cited

U.S. PATENT DOCUMENTS

| | | | |
|---|---|---|---|
| 4,371,752 | 2/1983 | Matthews et al. | 379/88.26 |
| 5,065,392 | 11/1991 | Sibbitt et al. | 348/3 |
| 5,263,025 | 11/1993 | Torii et al. | 370/468 |
| 5,530,852 | 6/1996 | Meske, Jr. et al. | 395/200.36 |
| 5,572,643 | 11/1996 | Judson | 395/200.48 |
| 5,649,186 | 7/1997 | Ferguson | 707/10 |
| 5,659,729 | 8/1997 | Nielsen | 707/3 |
| 5,673,322 | 9/1997 | Pepe et al. | 707/501 |
| 5,675,507 | 10/1997 | Bobo, II | 395/200.36 |

OTHER PUBLICATIONS

James, Official Netscape Navigator 2.0 Book, Windows Edition, Ventana Communications Group, Inc., only providing cited pages, Feb. 20, 1996.

*Primary Examiner*—James P. Trammell
*Assistant Examiner*—Cuong H. Nguyen
*Attorney, Agent, or Firm*—Klarquist Sparkman Campbell Leigh & Whinston, LLP

[57] ABSTRACT

Data requests (e.g., for a hyper text markup language document) made from a client application on a client computer connected to a computer network (e.g., the Internet) are often large. The data received by a client application is often received at a very slow rate due to network congestion and other factors. In addition, the data received may have references to embedded graphical images. If the data received does not contain the display dimensions of the embedded graphical images, then the data cannot be properly displayed until the dimensions of the embedded graphical images are known. When a data request is made, the data transfer rate is monitored. When the receive data transfer rate is slow, and the data contains an embedded graphical image of unknown dimensions, a small placeholder image is automatically displayed for the user instead of the actual data. The small placeholder image holds a place on a display device for the data or the embedded graphical image until the data or embedded graphical image is received. When embedded graphical image is received, the placeholder image is removed, and the display device is reformatted to display the embedded graphical image.

38 Claims, 9 Drawing Sheets

AUTOMATIC DATA DISPLAY FORMATTING WITH A NETWORKING APPLICATION

FIELD OF INVENTION

The present invention relates to displaying computer data. More particularly it relates to displaying data received by a computer networking application from a computer network.

BACKGROUND AND SUMMARY OF THE INVENTION

The Internet is a world-wide network of cooperating computer networks. Connected to the Internet are thousands of individual computers, each with a variety of application programs.

From a user's point of view, access to the Internet and its services is typically are accomplished by invoking a network application program (e.g., an Internet browser). The network application program acts as an interface between the user and the Internet. Network application programs are typically "client" applications that accept commands from the user and obtain Internet data and services by sending requests to "server" applications on other computers at other locations on the Internet.

There are many types of client network applications known in the art including network browsers such as the Internet Explorer by Microsoft Corporation of Redmond, Washington; Netscape Navigator by Netscape Communications of Mountain View, Calif.; and Mosaics by the National Center for Supercomputer Applications (NCSA) of Champaign-Urbana, Ill. These network browsers send network requests via the File Transfer Protocol (FTP), Simple Mail Transfer Protocol (SMTP), Hyper Text Transfer Protocol (HTTP), Gopher, etc. The network requests are used to exchange data with computer networks such as the Internet.

HTTP is a protocol used to access data on the World Wide Web. The World Wide Web is an information service on the Internet containing documents created in Hyper Text Markup Language (HTML). HTML allows embedded "links" to point to other remote data or documents, which may be found on other Internet host computers. HTML document links may retrieve the remote data by use of HTTP, FTP, Gopher, or other Internet application protocols.

HTML also allows graphical images to be embedded in HTML documents. When a graphical image is embedded in a HTML document, the dimensions or size of the embedded graphical image may or may not be defined with HTML statements. For example, the size of an embedded graphical image may be defined in HTML by <IMG SRC="file.gif" WIDTH=X HEIGHT=Y>, where IMG is a HTML reference to an embedded image, SRC="file.gif" defines the location and name of the file containing the graphical image embedded in the HTML document, (e.g., a Graphics Information File or *.GIF) X,Y are the respective width and height of the graphical image measured in pixels. However, HTML does not require the size of an embedded graphical image be included in the HTML document. If the size of the graphical image is not included in the HTML statement embedding the image (e.g., <IMG SRC="file.gif">), the size of the embedded graphical image is determined (e.g., by the network browser) when the embedded graphical image is received. The position of the embedded graphical image is defined at least by the location of the HTML statement referencing the embedded image.

As is known in the art, a number of network browsers that request data from a computer network like the Internet will not display any of the data until all the requested data is received. A network browser that does not display any data until all of it is received can cause a user to wait relatively long time periods (e.g., greater than 5 seconds) for any data to be displayed. These delays can be substantial, particularly when data with large or complex embedded or graphical images are received by modem over conventional telephone lines. These long time periods without seeing any data cause frustration and uncertainty on the part of the user. In addition, because of the delays, the user cannot know whether the data is actually available or whether the link to the data is operational. Even if part of the data is received quickly, the network browser appears to perform poorly because no data is displayed until all the requested data is received. The appearance of poor performance is amplified if data is actually received from a slow server or on a low bandwidth link.

In contrast, other network browsers will display data as it is received, even while more data is to follow. If the received data contains an embedded graphical image of an unknown size, a small standard graphical image or icon is placed on the user's computer display at the position where the embedded graphical image will be displayed when it has been downloaded. The display of other data (e.g., text data) proceeds as it is received. When the embedded graphical image is fully received, and the size is determined, the network browser reformats the display to include the image.

If the requested data contains multiple embedded graphical images, this type of network browser will repeatedly reformat the display after each embedded graphical image is received. Reformatting of the display is computationally expensive and typically very slow. In addition, during data transfer over a fast network link (e.g., an Integrated Services Digital Network (ISDN) link capable of data transfer rates of 64 kilo-bits-per-second (kbps), or other high bandwidth links) the format of the computer display will sometimes change very quickly as each embedded graphical image is received. This quick changing of format of the display appears to the user as "flashing" that makes the display unreadable for the user.

The present invention helps overcome the problems associated with displaying data requested by a networking application (e.g., a network browser) from a computer network. The present invention includes a method of displaying data received by a networking client application (e.g., a network browser) in response to a data request made to a network server application. After the data request is made, a receive data transfer rate for data received from the server application is determined. If the receive data transfer rate is slower than a predetermined minimum receive data transfer rate (i.e., the data transfer rate is "slow") and a graphical image is embedded in the requested data whose size is not initially known, a placeholder is displayed by the networking client application instead of displaying the received data.

The placeholder includes a small graphical image or icon that represents data being received at a slow transfer rate. If the receive data transfer rate is not slower than a predetermined minimum receive data transfer rate (i.e., the data transfer rate is "fast"), then data is displayed for a user as it is received and a placeholder is not used.

When the width and height of all the requested images that are inhibiting the display of data have been received, the display is reformatted once to remove the placeholders (if any were used) and display all the data received for the user. Alternatively, the display could also be reformatted a small number of times (e.g., 2–3 times instead of once). However, the whole display is not reformatted. Only those areas of the display which must change (e.g., areas containing the placeholders) are reformatted.

The present invention switches into and out of two display modes automatically (i.e., without user input) depending on the receive data transfer rate. If the receive data transfer rate is at least as fast as a predetermined minimum received data transfer rate (i.e., the receive data transfer rate is "fast"), then a "normal" display mode is used, and data is displayed as it is received. If the receive data transfer rate is slower than a predetermined minimum received data transfer rate (i.e., the receive data transfer rate is "slow") and the data contains an embedded graphical image whose size is not known, then a "placeholder" display mode is used, and a placeholder is displayed instead of the actual data received. Alternatively, the present invention allows a user to override the automatic switch between the normal and placeholder modes to allow the network browser to display all data received exclusively in either the normal or the placeholder display mode.

In an alternative implementation of the present invention, the user can also trigger the placeholder mode automatically while in the normal mode by attempting to view a selected portion of the data or document being received from the server computer before the selected portion (e.g., a selected portion of an image) is received at the client computer. For example, a user can attempt to view such a selected portion by scrolling to the end of the received data when more data is to be received or scrolling to a location where a not yet received portion of the data (e.g., a graphical image) is to be located. As is known in the art, scrolling through documents or data can be controlled by graphical user interfaces such as scroll bars, buttons, or menus, or by other conventional keypad or cursor controls.

If the selected portion of the data or document is not available at the time the user scrolls to the selected portion, placeholder mode is initiated automatically and a placeholder is rendered in place of the unavailable selected portion of the data. Preferably, the down-arrow in the scroll bar changes state (e.g., to a different color) to inform the user that additional data can be displayed in the placeholder mode, but actual requested data is not yet available for viewing in the normal mode. If additional data is available, the down-arrow in the scroll bar does not change state and the additional data is displayed for the user in the window in the normal mode.

In the present invention, the receive data transfer rate is determined with heuristics or standards that include comparing the actual receive data transfer bandwidth to the available receive data transfer bandwidth, setting a timer after data request and determining if the timer expires before the data requested is completely received, determining the available receive data transfer bandwidth before sending any data requests, and immediately identifying small transfer bandwidths, or slow network servers, etc. However, other heuristics or standards could also be used to monitor the receive data transfer rate.

The present invention displays data as it is received or automatically uses placeholders for data if the receive data transfer rate is slow. An automatic switch between placeholder display mode and normal display mode maximizes the display speed for data with slow receive data transfer rates while minimizing the changes in formatting that can arise when data is received at fast receive data transfer rates. For slow receive data transfer rates, placeholders eliminate user frustration and uncertainty by displaying for the user the data that is available. For fast receive data transfer rates, the single (or minimal number of) reformatting the display in the present invention eliminates the flicker problem characteristic of some conventional browsers on fast data transfer links. In addition, reformatting only the portion of the display that will change helps to eliminate unnecessary computations, and thus makes the display of network data significantly faster, even on slow data transfer links.

The foregoing and other features and advantages of the present invention will be more readily apparent from the following detailed description, which proceeds with reference to the accompanying drawings.

DETAILED DESCRIPTION OF A PREFERRED EMBODIMENT

Figure 1:
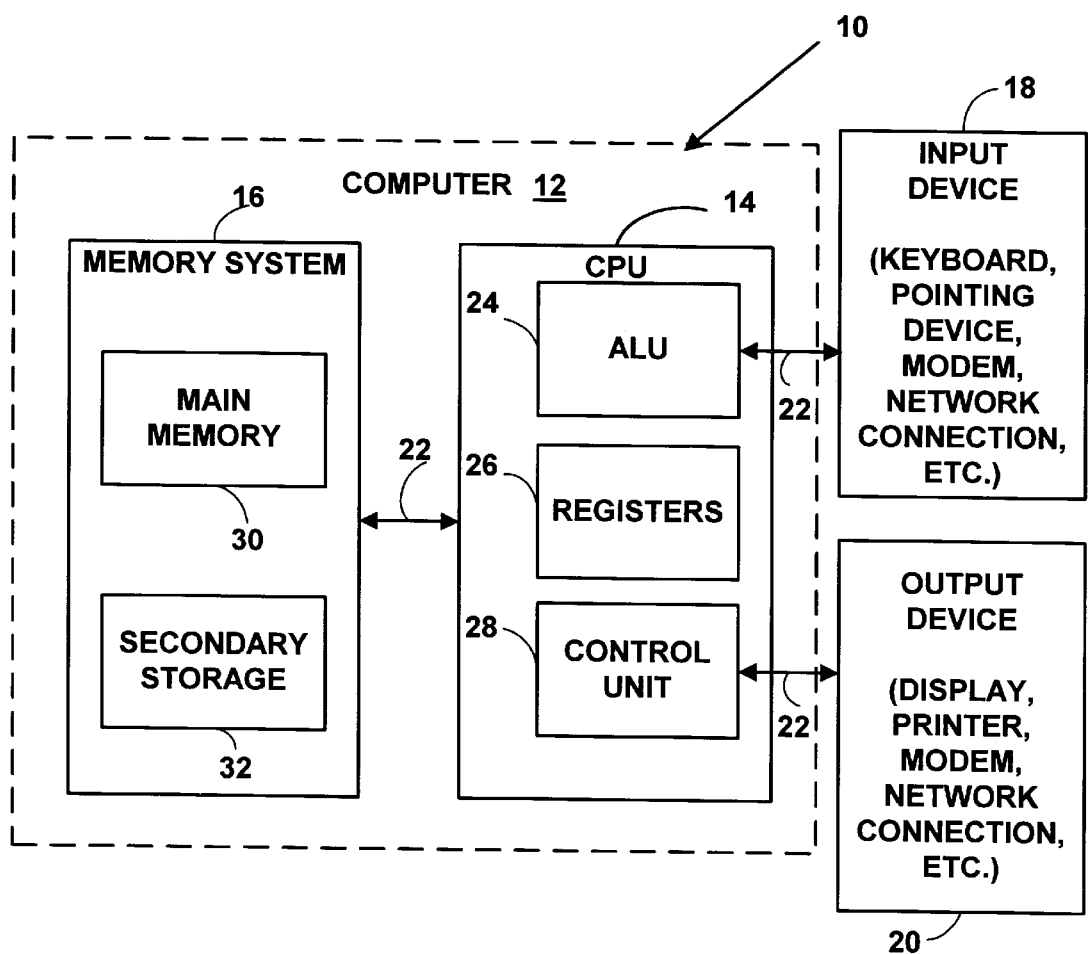
FIG. 1 is a block diagram of a computer system used to implement a preferred embodiment of the present invention.

Referring to FIG. 1, an operating environment for a preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g. a microphone, etc.), or any other device providing input to the computer system 10. The output device 20 can comprise a display, a printer, an audio device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

Figure 2:
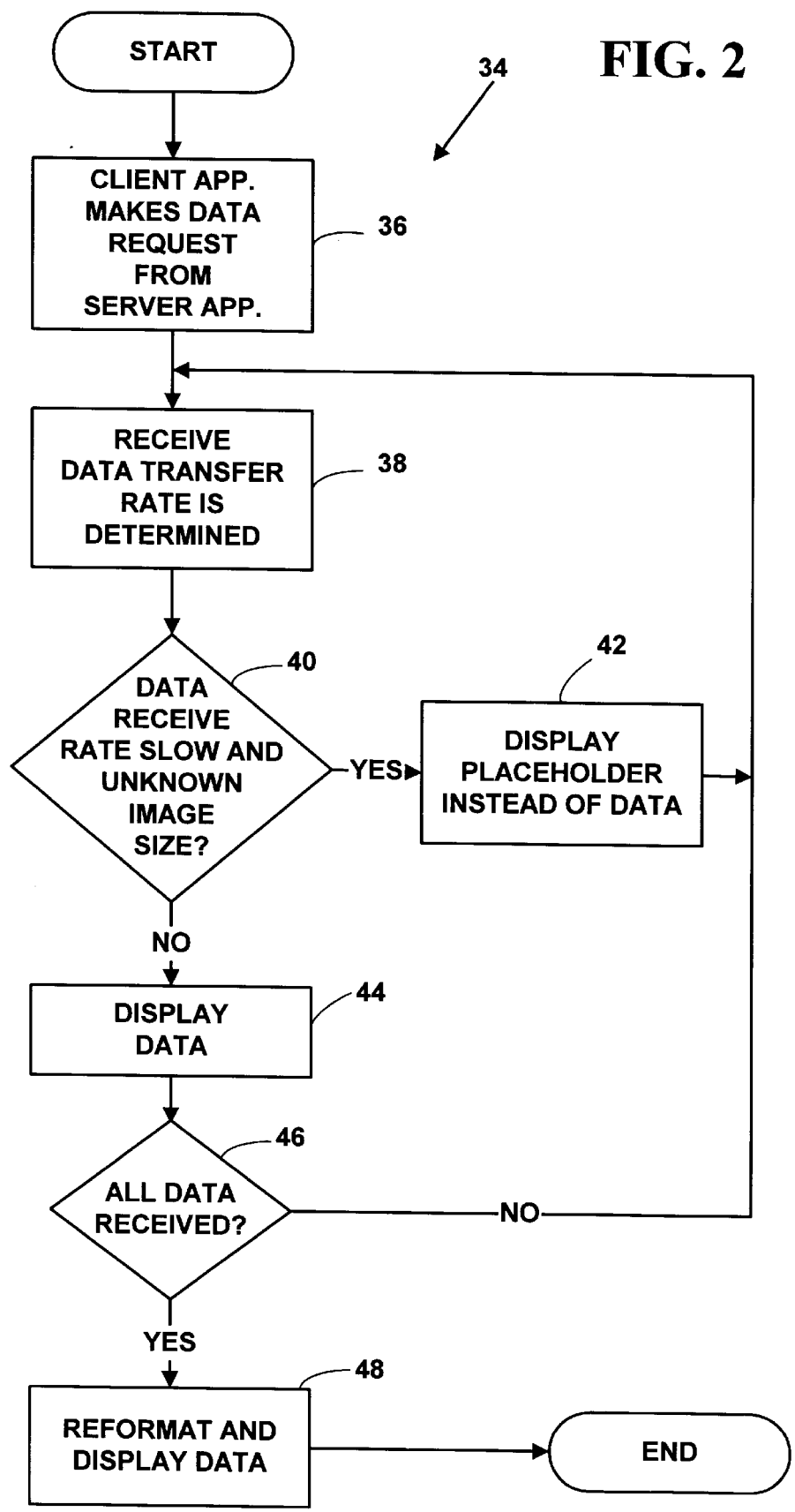
FIG. 2 is a flow diagram illustrating a method of data display for a preferred embodiment of the present invention.

As is shown in FIG. 2, a preferred embodiment of the present invention includes a method 34 of displaying data on a display device received by a client networking application (e.g., a network browser) from a server application on a computer network (e.g., the Internet, an intranet, etc.). The client networking application makes a data request (e.g., a HTML document) 36 for data from the server application. When the data request is made, receive data is transferred from the server application to the client networking application and a receive data transfer rate is determined 38.

If the receive data transfer rate is slower than a predetermined minimum receive data transfer rate (e.g., 1–3 seconds to receive a complete screen, window, or page of data and is "slow") and an embedded graphical image of unknown size is encountered 40, a placeholder is displayed 42. Preferably, the placeholder is rendered in the location where the embedded graphical image or other data is to be rendered. The placeholder includes a small graphical image or icon for data which is being received at a slow transfer rate, instead of displaying the actual received data. If the receive data transfer rate is at least as fast as a predetermined minimum receive data transfer rate (and is "fast"), the actual data received is displayed 44 as the data is received. The method continues until all the requested data is received 46.

A preferred embodiment of the present invention switches automatically (i.e., without further user input) (process steps 38–44) between a normal display mode and a placeholder display mode depending on the receive data transfer rate. When all the requested data is actually received, the display is reformatted to remove any placeholders (if any were used) 48, and display all the data received. The details of the data display method 34 are explained below.

Figure 3:
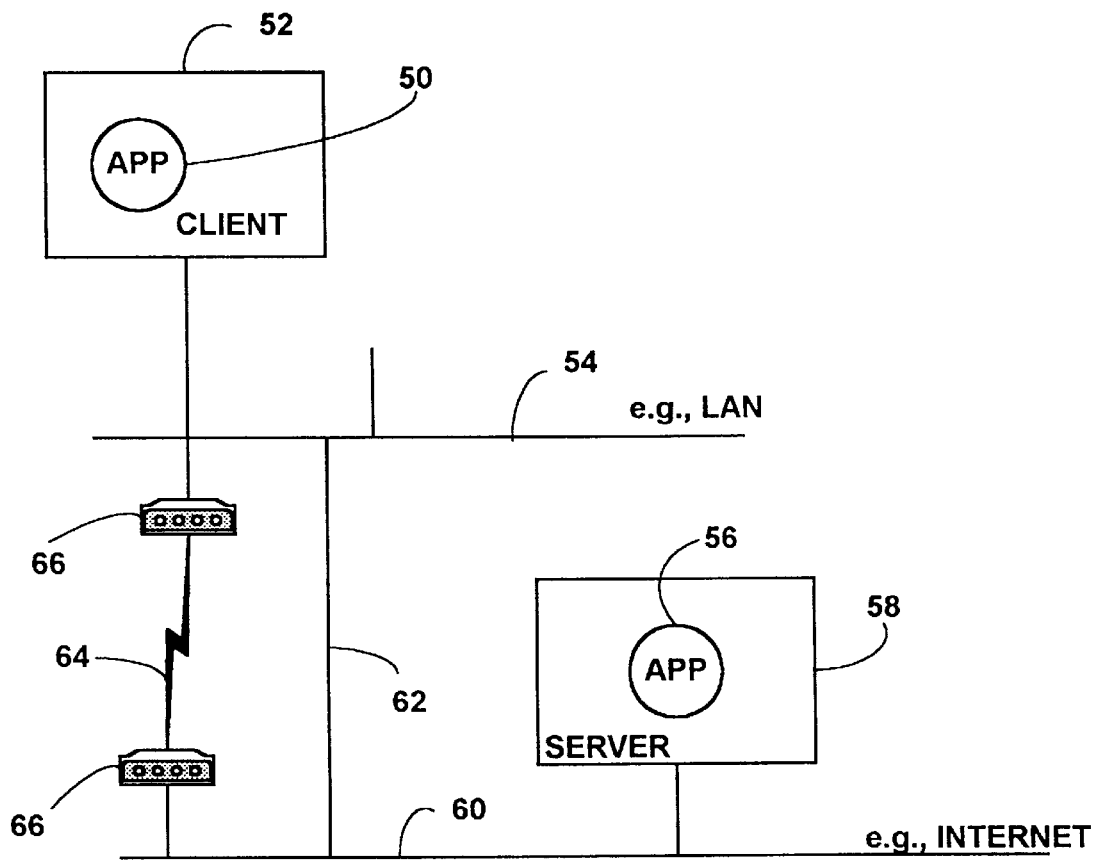
FIG. 3 is a block diagram illustrating one possible configuration for a preferred embodiment of the present invention.

FIG. 3 is a composite diagram representing common examples of network (e.g., Internet) communication. As is shown in FIG. 3, a client networking application program (e.g., a network browser) 50 resides on a client computer 52 which is a stand alone computer, or is a computer connected to a local area network (LAN) 54. Client networking application program 50 can communicate (e.g., make a data request) with a server application 56 on a remote server computer 58 connected to the remote computer network (e.g., the Internet) 60. The communications can be a direct connection 62, or the communications 64 can be achieved using a pair of modems 66 or some other telecommunications device (e.g., an ISDN device) (not shown in FIG. 3).

Client networking application program 50 preferably uses the data display method 34 described above, to make data requests from the server application 56. The client networking application 50 can be a network browser or other networking application which makes data requests from a server application 56 on remote server computer 58 connected to a computer network 60 such as the Internet. Hereinafter the client networking application program 50 will be referred as "network browser." The computer network 60 can also be a Local Area Network (LAN) (e.g., an "intranet") or a computer network other than the Internet.

The data requests made by the network browser 50 may be made via the File Transfer Protocol (FTP), Gopher, Hyper Text Transfer Protocol (HTTP), etc. FTP is used to move files from one computer to another. FTP operates independently of where the computers are located, how they are connected, or even whether they are using the same operating system. Provided both computers can "talk" FTP and have access to a mutually common network, FTP can be used to transfer files.

Gopher allows an application to browse Internet resources using menus. The Gopher menus allow browsing of Internet resources regardless of their type. A Gopher user need not specify formal Internet details (e.g., domain names, IP addresses, etc.) to find desired data.

HTTP is a protocol used to access data on the World Wide Web. The World Wide Web is an information service on the Internet containing documents created in the Hyper Text Markup Language (HTML). HTML allows "links" to other documents, which may found on other Internet host computers. The HTML document links may use HTTP, FTP, Gopher, or other Internet application protocols, to retrieve the remote data pointed to by the link.

HTML also allows embedded graphical images to be included in a HTML document. When a graphical image is embedded in a HTML document, the size of the embedded graphical image may or may not be defined with HTML statements. For example, in HTML defining the size of an embedded graphical image is completed with <IMG SRC="file.gif" WIDTH=X HEIGHT=Y>, where IMG is a HTML reference to an embedded image, SRC="file.gif" defines the location (e.g., a local *.gif file) and name (e.g., "file.gif") of the file containing the embedded graphical image, in this example a graphics image stored in Graphics Information File (*.GIF) format, and X,Y are the width and height of the embedded graphical file image measured in pixels respectively. However, other formats can also be used.

HTML does not require the size of an embedded graphical image be included in the HTML document. If the size of the embedded graphical image is not included in the HTML image statements (e.g., <IMG SRC="file.gif">), the size of the embedded graphical image is determined when the embedded graphical image is received. The data requested by a network browser 50 is typically an HTML document (e.g., a World Wide Web page) which usually contains text, embedded graphical images, links to other HTML documents, etc.

When the network browser 52 makes a data request (e.g., formatting a HTML document), a receive data transfer rate is determined according to predefined heuristics or standards. Specifically, the receive data transfer rate is characterized as being "fast" (i.e., greater than or equal to a predetermined minimum data transfer rate) or "slow" (i.e., less than the predetermined minimum data transfer rate). One preferred heuristic includes determining the actual receive data transfer rate (e.g., in bit-per-second, (bps)) and comparing the actual receive data transfer rate to the available bandwidth for receiving data. The receive data transfer rate is characterized as slow, and a placeholder is rendered, whenever the actual receive data transfer rate is less than a predetermined percentage (e.g., 50 percent for an ISDN link having an available bandwidth of 64 kbps).

An alternative heuristic is to make a data request and set an internal timer. If the timer expires before embedded graphic images of unknown size are downloaded, the receive data transfer rate is characterized slow, and a placeholder is rendered.

Another alternative heuristic is to identify the available bandwidth for receiving data before sending any data requests. If the available bandwidth for receiving data is small (e.g., the user has a 9,600 bps modem or is connected to a local or remote network server that is known to be slow), then the receive data transfer rate is characterized as slow. In this case, an immediate switch to the placeholder mode will be completed. In addition, other alternative heuristics could also be used to determine or characterize the receive data transfer rate.

The automatic placeholder display mode is controlled by an internal flag called Mode. The Mode is set to the value NORMAL (e.g., NORMAL=0) as a default, or to the value PLACEHOLDER. The flowchart in FIGS. 4A–4B show additional details for the data display method 34 shown in FIG. 2 and described above.

Figure 4A:
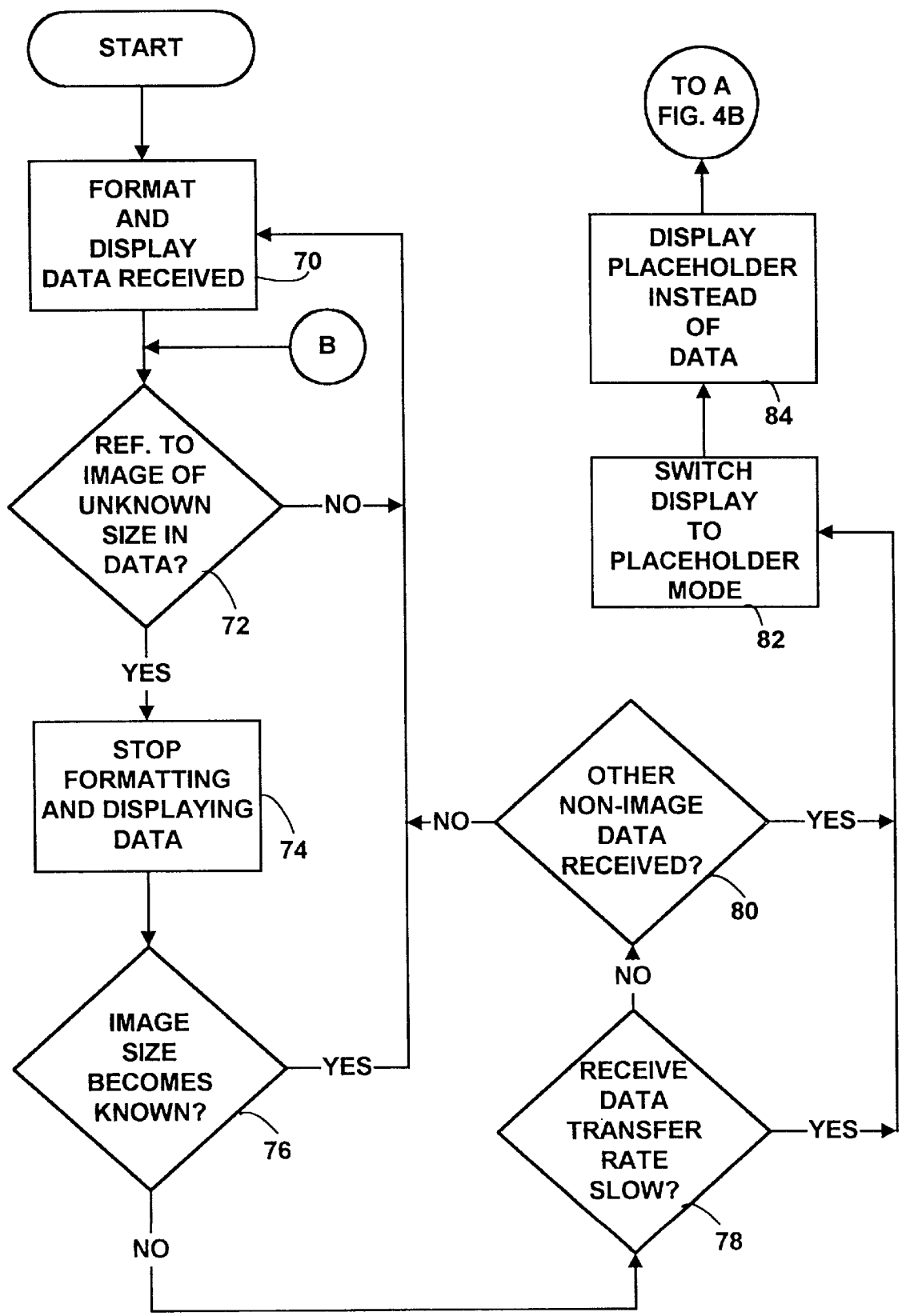
FIGS. 4A–4B is a flow diagram illustrating additional details of the data display method shown in FIG. 2.
Figure 4B:
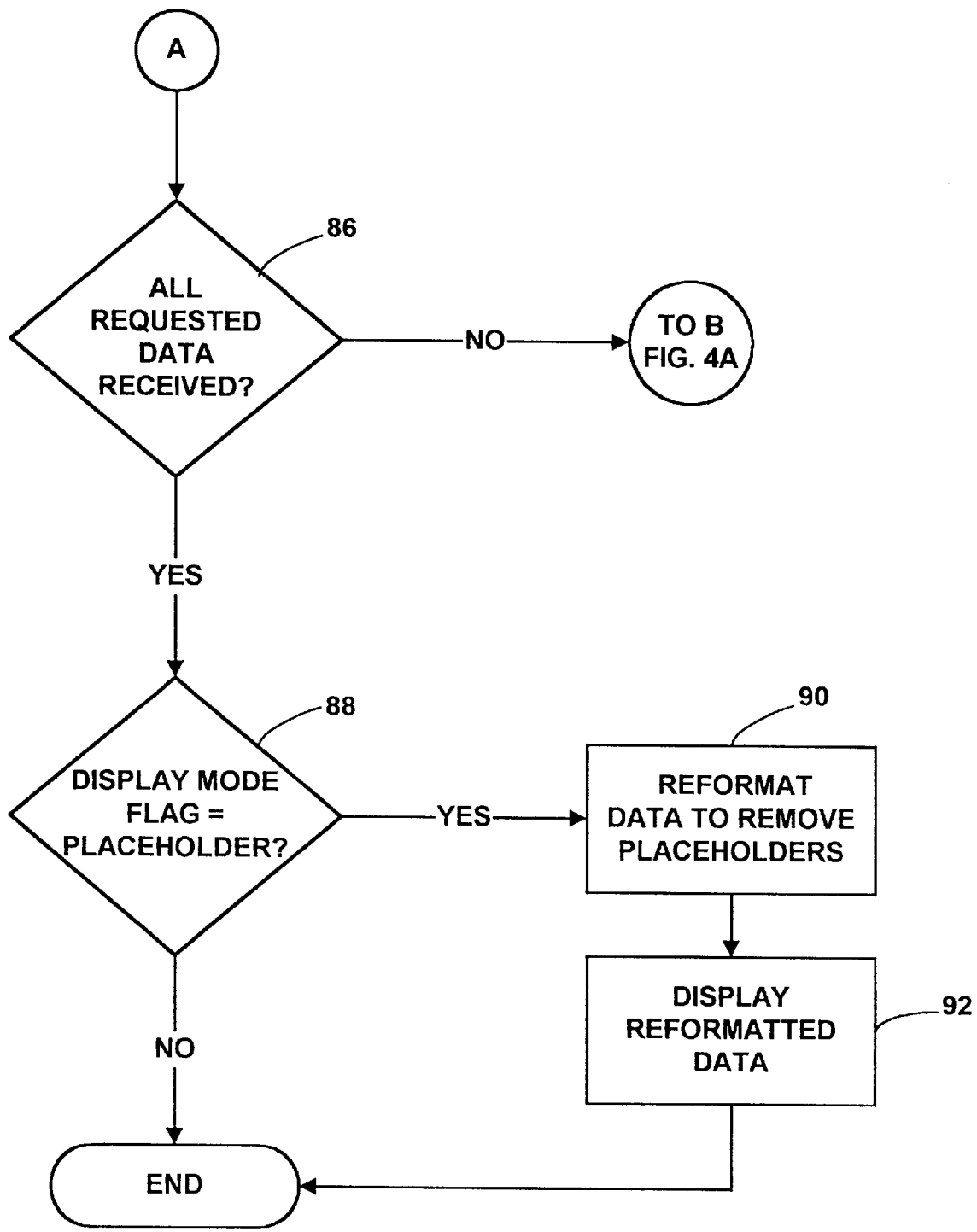

As shown in the flowchart in FIGS. 4A–4B, data received is formatted and displayed 70 (FIG. 4A) until a reference to an embedded graphical image of an unknown size is encountered (if any) 72. If an embedded graphical image of an unknown size is encountered 72 (e.g., represented by an HTML reference such as <IMG SRC="file.gif">), then the formatting and displaying of received data stops at a current display line 74. If the height and width of the embedded graphical image become known, the data received is formatted and displayed 70. If the height and width of the embedded graphical image remain unknown 76 and the receive data transfer rate is less than the predetermined minimum receive data transfer rate (i.e., is slow) 78, or if other data was received 80 (e.g., text data) while the height and width of the embedded graphical image remain unknown, the display mode is switched to the placeholder display mode 82 by setting the internal display mode flag Mode to the value PLACEHOLDER (e.g., PLACEHOLDER=1). A placeholder of known height, width, and image characteristics is temporarily displayed 84 instead of the embedded graphical image being received.

In a preferred embodiment of the present invention, the placeholder is a small (e.g., 25×25 pixel) graphical image or icon which is stored and available locally to the browser network as a Graphics Information File (e.g., *.GIF file ) or a Joint Photographic Experts Group (JPEG) (e.g., *.JPG file), etc. However, other file formats or image formats can also be used.

After all the requested data is received 86 (FIG. 4B) the display mode flag Mode is checked 88. If the display mode flag Mode is set to PLACEHOLDER, the display is reformatted 90 to remove any placeholder icons and replace them with the corresponding embedded graphical images that have been received. The reformatting is done once (or a small number of times) to present the received data on the display 92. If all the requested data has not yet been received, then process steps (72–86) are repeated until all requested data is received, except that process block 82 need be executed only once if the display mode flag Mode is already set to PLACEHOLDER (i.e., an additional conditional statement could be added before process block 82 to check the value of the display mode flag Mode). If the display mode flag Mode is set to NORMAL (i.e., the placeholder display mode was not used), the received data is formatted and displayed only once after all the data is received.

Figure 5A:
FIGS. 5A–5C are block diagrams illustrating an example sequence in placeholder display mode of text and placeholder icons for a preferred embodiment of the present invention.

As an example, a network browser 50 requests a data request for a HTML document with several embedded graphical images. As is shown in FIG. 5A, text data 94 is first received and displayed on a display device 96. After the text data 94 is received, a HTML reference to an embedded graphical image (e.g., <IMG SRC="cdstore.gif">) with an unknown size is encountered in the HTML data received. Since the size of the embedded graphical image is unknown, a placeholder icon 98 will be displayed on the display device 96' (FIG. 5B) if the receive data transfer rate is less than the predetermined minimum receive data transfer rate.

As the embedded graphical image is being received, additional data text 100 is received and displayed on the display device 96'. Data text 100 is displayed as it is received, in contrast to embedded graphical images of unknown size, which require that significant portions of the images be received before their size can be determined. The placeholder mode eliminates the delay that can arise when the receive data transfer rate is slow, in determining the size of an embedded graphical image and therefore the formatting and display of otherwise available data (e.g., text).

Next a reference to a second embedded graphical image with an unknown size (e.g., <IMG SRC="coffeestore.gif">) is received and then additional data text is received. As is shown in FIG. 5C, a second placeholder icon 102 is displayed for the second embedded graphical image and additional text data 104 is subsequently received and displayed. Again, the placeholder icon 102 provides known temporary formatting that otherwise would be unavailable until the size of the second embedded graphical image is determined.

Figure 5B:
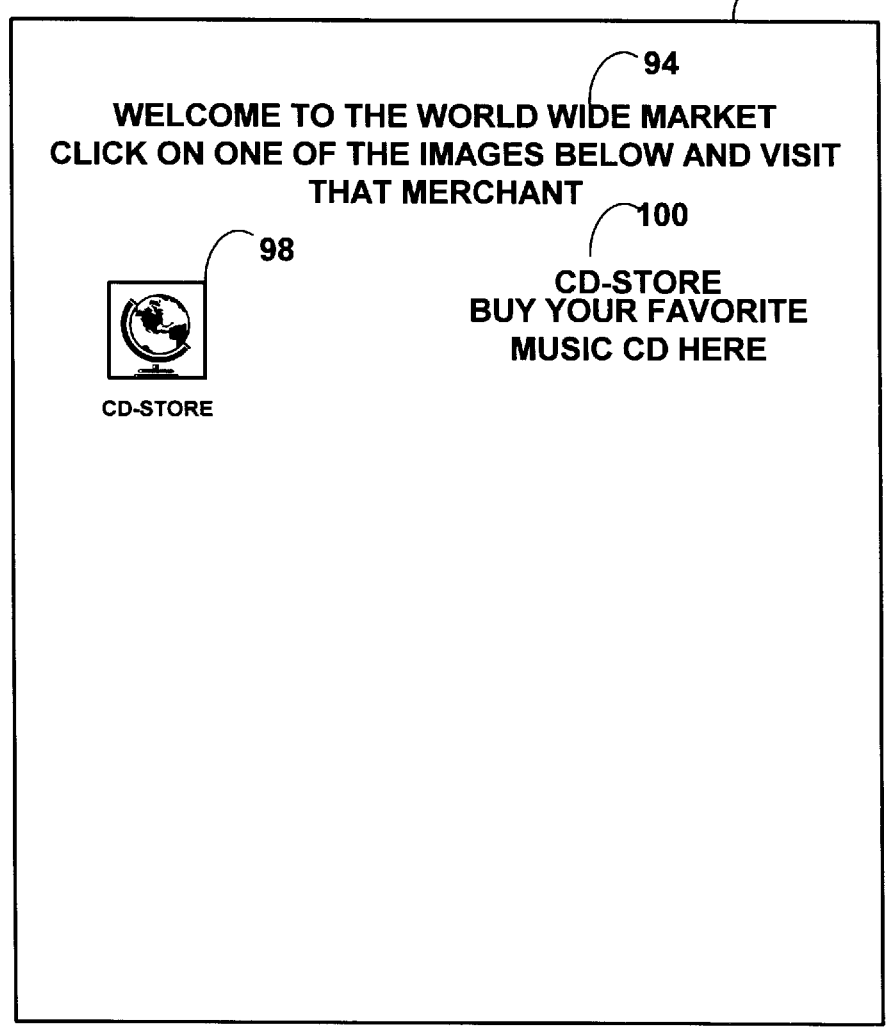
Figure 5C:
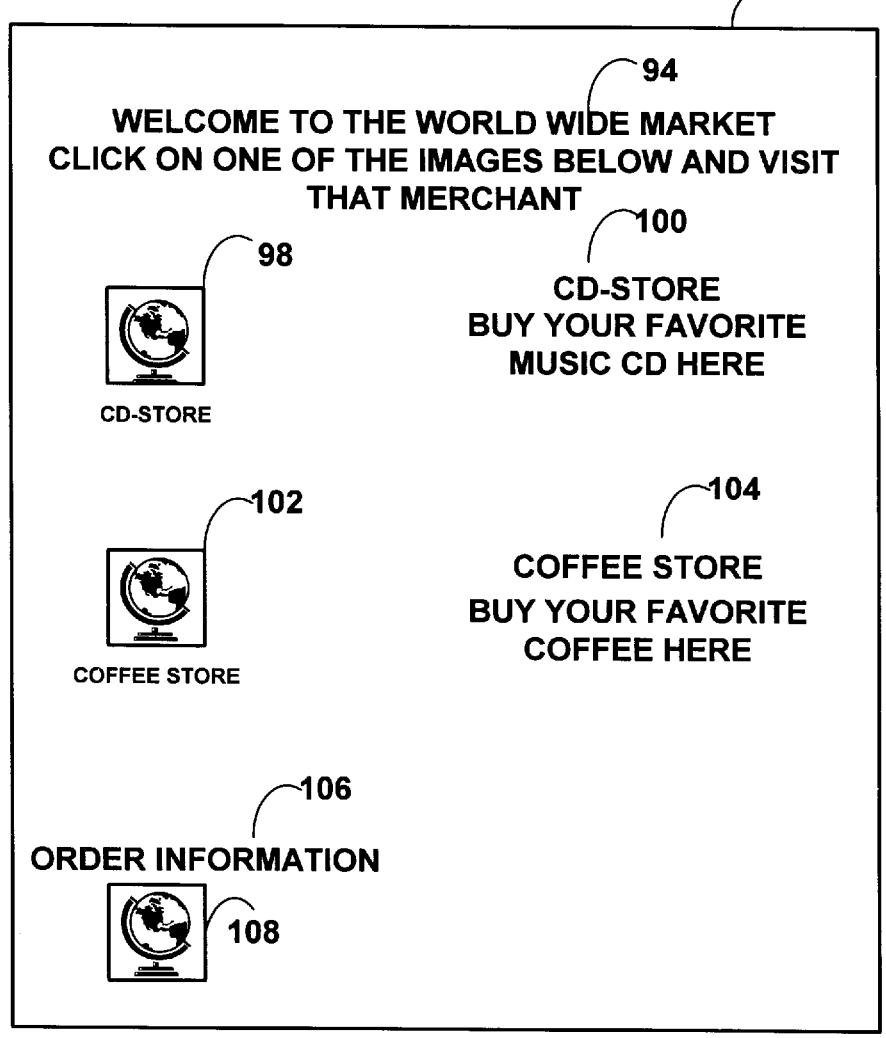

In FIGS. 5B–5C, the placeholder icon used is a graphical image of a globe (e.g., for a "World Market Place"). However, any graphical image can be used for the placeholder icon, or multiple unique placeholder icons could also be used for each of multiple embedded graphical images. FIGS. 5B–5C illustrate a placeholder display mode for the received data.

A preferred embodiment of the present invention switches between displaying data as it is received and displaying placeholder icons for the data automatically (i.e., without further user input) based on the received data transfer rate as was described above.

Figure 6:
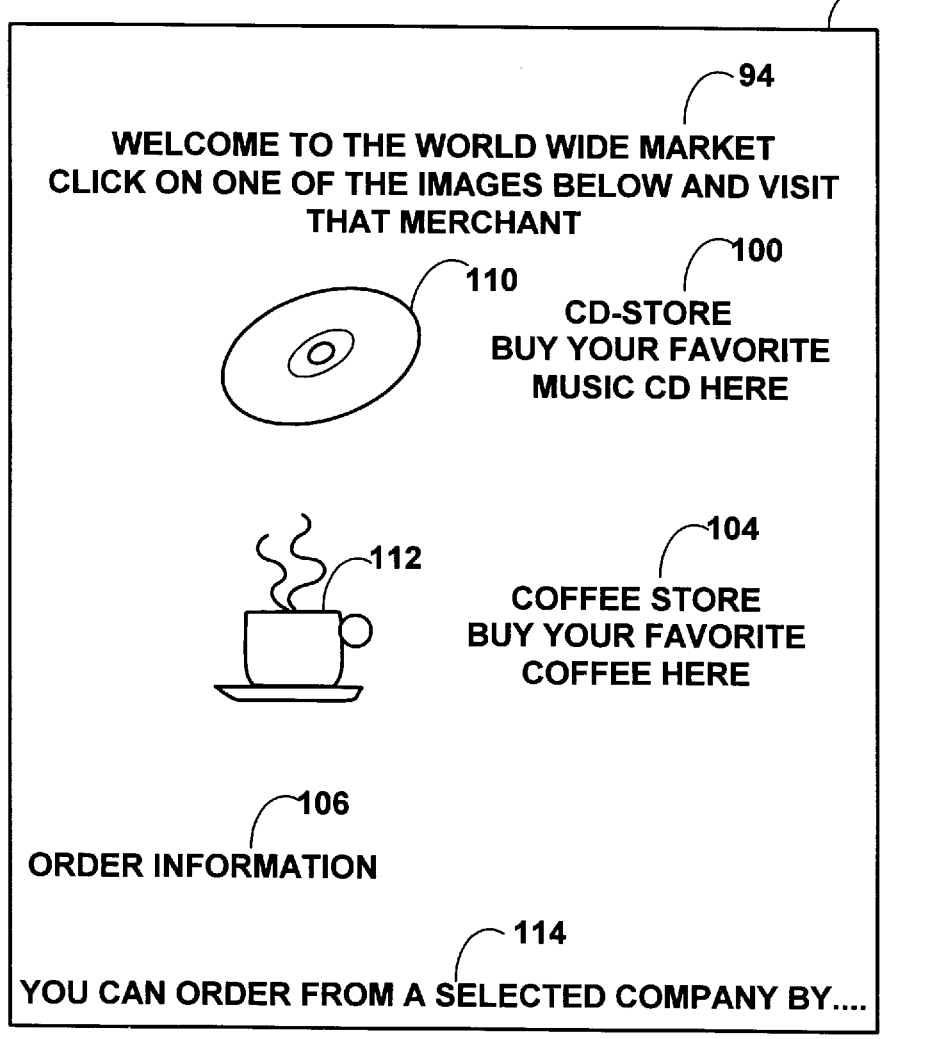
FIG. 6 is a block diagram illustrating a final display layout in normal display mode for the example sequence of FIG. 5.

When the width and height of all requested images that are inhibiting the display of data have been received, as is shown in FIG. 6 the display 96''' is reformatted once to remove the placeholders and display all the data received for the user. Alternatively, the display could also be reformatted a small number of times (e.g., 2–3 times instead of once) as predetermined amounts of data (e.g., three-five embedded graphical images) is received.

When replacing placeholders with corresponding embedded graphical images, only those areas of the display affected by the replacement are reformatted. For example, the display area containing text data 94 in FIG. 6 is not reformatted because this area is not affected by replacement of a placeholder with an embedded graphical image. The same is true for the display area containing text data 106. However, the areas of the display containing placeholder icons (98,102,106 FIG. 5C) are reformatted. The first placeholder icon 98 (CD-store) (FIG. 5C) is replaced by a graphical image of a compact disc (CD) 110 (FIG. 6), the second placeholder icon 102 (coffee store) (FIG. 5C) is replaced by a graphical image of a coffee cup 112, and the third placeholder icon 106 (order info) (FIG. 5C) is replaced by actual text data 114 (only a few characters of which is shown in FIG. 6). FIG. 6 illustrates a normal display view of the received data whereas FIG. 5C represents a placeholder display view.

An alternative embodiment of the present invention allows a user to override any automatic switching between the normal and placeholder display modes to allow the network browser to display all data received exclusively in either the normal or the placeholder display mode.

In an alternative embodiment of the present invention, the user can also trigger the placeholder mode automatically while in the normal mode by attempting to view a selected portion of the data or document being received from the server computer before the selected portion (e.g., a selected portion of an image) is received at the client computer. For example, a user can attempt to view such a selected portion by scrolling to the end of the received data when more data is to be received or scrolling to a location where a not yet received portion of the data (e.g., a graphical image) is to be located. As is known in the art, scrolling through documents or data can be controlled by graphical user interfaces such as scroll bars, buttons, or menus, or by other conventional keypad or cursor controls.

If the selected portion of the data or document is not available at the time the user scrolls to the selected portion, placeholder mode is initiated automatically and a placeholder is rendered in place of the unavailable selected portion of the data. Preferably, the down-arrow in the scroll bar changes state (e.g., to a different color) to inform the user that additional data can be displayed in the placeholder mode, but actual requested data is not yet available for viewing in the normal mode. If additional data is available, the down-arrow in the scroll bar does not change state and the additional data is displayed for the user in the window in the normal mode.

The present invention has been described with reference to the operation of an Internet browser. However, other Internet or intranet network applications and other network applications, client or server, could also use the present invention to display networking data.

An automatic switch between placeholder display mode and normal display mode eliminates user frustration and uncertainty by displaying something a user can see even if the receive data transfer rate is slow, or the data received is an incomplete data request. The single or small number of reformats of the display in the present invention eliminates the flicker problem described earlier on fast data transfer links. In addition, reformatting only the portion of the display that changes also helps to eliminate unnecessary computations, and thus makes the display of network data significantly faster, even on slow data transfer links.

In a preferred embodiment of the present invention, the computer system 10, uses the Windows 95 client/server operating system by Microsoft Corporation of Redmond, Wash. However, other client/server operating systems (e.g. Windows NT, OS/2, by IBM, etc.) could also be used. A client/server operating system is an operating system which is divided into a plurality of processes of two different types: server processes, each of which typically implements a single set of services, and client processes, which request a variety of services from the server processes. Object oriented programming is used to design the client/server operating system, where objects represent system resources.

For example, the Windows 95 client/server operating system provides shareable resources, such as files, memory, processes and threads, which are implemented as "objects" and are accessed by using "object services." As known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within computer memory 16 and represent specific electrical, magnetic or organic elements.

An "object type," also called an "object class," comprises a data-type, services that operate on instances of the data type, and a set of object attributes. An "object attribute" is a field of data in an object that partly defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e. sometimes known as an object method) defined in the object's class, and an object data block, containing the current values for each object variable (i.e. data members, sometimes known as an object property). An application has some reference to a chunk of memory containing the function table and the object data block through an object pointer. An application obtains this object reference by using a function call (direct or implied) in which that function allocates the object block in memory, initializes the function table, and returns the reference to said memory to an application.

The Windows 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

Processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context", which is the volatile data associated with the execution of the thread. A thread's context includes the contents of system registers and the virtual address belonging to the thread's process. Thus, the actual data comprising a thread's context varies as it executes.

A preferred embodiment of the present invention is implemented in the Internet Explorer by Microsoft Corporation of Redmond, Wash. However, other Internet or intranet network browsers or networking applications can also use the present invention. The Internet Explorer is a Window's client application and is executed as a Windows 95 process with a number of process threads. Alternatively, other configurations (e.g., a server network application instead of a client application) could also be used for a preferred embodiment of the present invention.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of our invention. Rather, we claim as our invention all such embodiments as come within the scope and spirit of the following claims and equivalents thereto.

We claim:

1. In a computer system with a client computer including a display device and a client application, the client computer in communication with a computer network including a server network computer with a server application, a method of rendering a document having at least one item embedded therein, the method comprising:

at the client application, requesting the document from the server application;

rendering at least a certain portion of the document at the client computer;

determining a receive data transfer rate for data received from the server application;

automatically determining whether the receive data transfer rate is slower than a predetermined minimum receive data transfer rate; and if it is determined that the data transfer rate is slower, rendering the document in a first mode comprising:

displaying a placeholder in the certain portion of the document in place of an item yet to be received and embedded in the document; and if it is determined that the data transfer rate is not slower, rendering the document in a second mode comprising:

displaying a received item embedded in the document without displaying a placeholder in place of the received item embedded in the document.

2. A computer-readable medium having computer-executable instructions for performing the steps recited in claim 1.

3. The method of claim 1 further comprising:

reformatting a portion of the document at a location beginning with the placeholder on the display device after the item embedded in the document is received, the reformatting including removing the placeholder and modifying a display format of the document.

4. The method of claim 1, where the client computer is in communication with a computer network over a network link, further comprising:

determining an actual bandwidth of the network link;

determining whether the actual bandwidth falls within a predetermined bandwidth range; and if the actual bandwidth is determined to not fall within a predetermined bandwidth range, displaying any data received in a placeholder view.

5. In a computer system with a client computer including a display device and a client application, the client computer in communication with a computer network over a network link, the computer network including a server network computer with a server application, a method of displaying data, comprising:

making a data request from the client application to the server application;

determining an available bandwidth of the network link;

determining an actual receive data transfer rate;

comparing the actual receive data transfer rate to the available bandwidth of the network link to determine whether the receive data transfer rate is slower than a predetermined minimum fraction of the available bandwidth; and if the receive data transfer rate is determined to be slower, displaying a placeholder in place of data yet to be received.

6. In a computer system with a client computer including a display device and a client application, the client computer in communications with a computer network including a server network computer with a server application, a computer readable medium having stored therein instructions for causing the computer system to perform the steps:

making a data request from the client application to the server application, the data request including a request for hyper text markup language data with an embedded graphical image;

receiving data from the data request at the client application from the server application;

determining whether the hyper text markup language data received contains the size of the embedded graphical image, and if not, displaying a graphical image placeholder on the display device for the embedded graphical image until all the embedded graphical image is received.

7. In a computer system with a client computer including a client display device and a client application, the client computer in communications with a computer network including a server network computer with a server application, a placeholder display system on the client display device, comprising:

means for determining a receive transfer rate for data received from the server application;

means for automatically switching to a placeholder mode if the receive transfer rate is determined to be slower than a predetermined minimum; and a graphical image placeholder rendered on the client display device for selectively identifying data requested by the client application from the server application and not received completely by the client application when in the placeholder mode.

8. A computer system with a client computer including a display device and a client application, the client computer being in communication with a computer network including a server network computer with a server application, the system comprising:

means for making a data request from the client application to the server application;

means for determining a receive data transfer rate for data received from the server application;

means for determining whether the receive data transfer rate is slower than a predetermined minimum receive data transfer rate; and means for automatically displaying a placeholder in place of a portion of data yet to be received if the receive transfer rate is determined to be slower than the predetermined minimum data transfer rate.

9. A method of displaying on a display device for presentation to a user data received from a remote server in response to a data request, the method comprising:

displaying in a first view at least some of the data received;

displaying in a second view at least some of the data received, the second view for presenting a placeholder in place of data yet to be received;

determining a data transfer rate; and automatically toggling between the first view and the second view based on the data transfer rate.

10. A computer-readable medium having computer-executable instructions for performing the steps recited in claim 9.

11. A computer-implemented method for displaying a document on a display device of a client computer, the document received by a client application on the client computer, the document received from a server application on a remote server in communication with the client computer, the document comprising a plurality of references to subportions of data having display locations within the document, the method comprising:

requesting the document be sent from the server application to the client application;

receiving at least some of the document at the client application;

determining a rate at which data is being received from the server application;

determining whether the rate is faster than a predetermined minimum; and if the rate is determined to be faster than a predetermined minimum, delaying formatting for display a portion of the document following the display location of a subportion until the subportion is received.

12. A computer-readable medium having computer-executable instructions for performing the steps recited in claim 11.

13. The method of claim 11 further comprising:

receiving the subportion of data;

after receiving the subportion of data, displaying the subportion at the display location of the subportion; and formatting for display the portion of the document after the display location of the subportion.

14. A method of displaying data in a computer system with a client computer including a display device and a client application, the client computer in communications with a computer network including a server network computer with a server application providing hyper text markup language data, at least some of the hyper text markup language data having an hyper text markup language image tag without display dimensions, the method comprising:

making a data request from the client application to the server application, the data request including a request for the hyper text markup language data;

receiving data from the data request at the client application from the server application;

determining whether the hyper text markup language data received indicates the display dimensions of an embedded graphical image; and if the hyper text markup language data received is determined to not indicate the display dimensions, displaying a graphical image placeholder on the display device for the embedded graphical image until the embedded graphical image is received.

15. The method of claim 14 further comprising:

determining whether the data requested has been received; and if the data requested is determined to have been received, reformatting the formatted data displayed on the display device, the reformatting including removing the placeholder from the display device and modifying a display format of the data to include the embedded graphical image.

16. The method of claim 14 where the client application is an Internet client application.

17. The method of claim 16 where the Internet client application is an Internet browser.

18. In a computer system with a client computer including a client application and a display device with a display area, the client computer in communication with a computer network including a server computer with a server application, a method of displaying a document, the document comprising references to a plurality of subportions of data, the method comprising:

at the client application, requesting the document from the server application;

displaying a portion of the document in the display area in a normal mode, wherein the normal mode comprises displaying at least a first subportion of data without displaying a placeholder for the first subportion;

receiving a user request to view an additional portion of the document not displayed in the display area; and determining whether a second subportion of data referenced in the additional portion is yet to be received; and if the second subportion is determined to be yet to be received, displaying the additional portion of the document in a placeholder mode, wherein the placeholder mode comprises displaying a placeholder in the display area in place of the second subportion.

19. The method of claim 18 wherein a third subportion is received, further comprising:

receiving the second subportion before receiving the third subportion; and delaying replacing the placeholder with the second subportion until after the second and third subportions are received.

20. The method of claim 18 wherein a scroll bar is presented on the display device for receiving the user request, the method further comprising:

if the second subportion of data in the additional portion is determined to be yet to be received, indicating on the scroll bar that data is yet to be received.

21. The method of claim 18 wherein a scroll bar is presented on the display device for receiving the user request, the method further comprising:

if the second subportion of data in the additional portion is determined to be yet to be received, changing a color of a portion of the scrollbar.

22. A computer-readable medium having computer-executable instructions for performing the steps recited in claim 18.

23. A computer-implemented method for displaying data received from a remote server on a display device of a client computer, the data comprising a first data component and a second data component, the first data component received separately from and prior to the second data component, the second data component indicated by a tag in the first data component, the tag not indicating the display dimensions of the second data component, the method comprising:

requesting the data be sent from the server to the client computer;

receiving at the client computer at least a portion of the first data component;

determining a reception rate indicative of a rate at which data arrives at the client computer from the server;

automatically selecting a first mode if the reception rate is slower than a predetermined rate, wherein the first mode comprises:

displaying on the display device a placeholder in place of the second data component;

receiving the second data component; and replacing the placeholder on the display device with the second data component; and automatically selecting a second mode if the reception rate is not slower than the predetermined rate, wherein the second mode comprises:

receiving the second data component; and displaying the second data component on the display device without displaying a placeholder in place of the second data component on the display device.

24. The method of claim 23 wherein the first mode further comprises formatting for display on the display device a portion of data in the first component at a location after the placeholder.

25. The method of claim 24 wherein the second mode further comprises delaying, until after the second data component is received, formatting a portion of the first data component for display at a location after a display location of the second data component.

26. The method of claim 25 wherein the first data component comprises text and the second data component comprises an image for embedding in the text.

27. A method of displaying an electronic document on a display device of a client computer including a client application, the client computer in communication with a computer network including a server network computer with a server application providing the document, the document including an image tag indicative of an image embedded in the document, the image tag without display dimensions, the method comprising:

requesting the document at the client application from the server application;

receiving at the client application from the server application an image tag indicative of an embedded image;

determining whether the received image tag indicates display dimensions;

if it is determined that the received image tag does not indicate the display dimensions, displaying a graphical image placeholder on the display device in place of the embedded image until the embedded image is received; and displaying an additional portion of the document after displaying the placeholder and before receiving the embedded image.

28. The method of claim 27 further comprising:

requesting the embedded image at a start time;

determining an elapsed time from the start time;

delaying displaying the graphical image placeholder if the elapsed time is less than a predetermined amount.

29. The method of claim 27 further comprising:

determining whether the embedded image has been received at the client; and if the embedded image is determined to have been received at the client, reformatting the displayed portion of the document and replacing the placeholder with the embedded image.

30. A computer-readable medium having computer-executable instructions for performing the steps recited in claim 27.

31. In a computer system with a client computer including a client display device and a client application, the client computer in communications with a computer network including a server network computer with a server application, a placeholder display on the client display device, comprising:

data rendered on the client display device requested by the client application from the server application;

a graphical image placeholder rendered on the client display device for selectively identifying data requested by the client application from the server application and not received completely by the client application, wherein the graphical image placeholder is a graphical icon of predetermined height, width and image characteristics which icon is displayed temporarily until the requested data is received;

means for switching between a normal mode and a placeholder mode, wherein the normal mode displays the data rendered on the client display device without rendering the placeholder, and wherein the placeholder mode renders the placeholder within the data rendered on the client device, wherein the means for switching automatically switches between normal and placeholder mode based on a receive rate at which data is received at the client application;

wherein the means for switching automatically switches into placeholder mode when a user requests to view a portion of data not rendered on the client display device, the portion of data comprising a reference to data yet to be received by the client application.

32. A computer-readable medium having computer-executable instructions for performing the steps recited in claim 27.

33. In a computer system with a client computer comprising a client display device and a client application, the client computer in communication with a computer network, the computer network comprising a server computer with a server application, a document display in the client application, the document display comprising:

a document requested by the client application from the server application and rendered on the client display device;

a graphical image placeholder displayed within the document, the placeholder identifying an item embedded in the document and requested by the client application from the server application but not yet received by the client application, the placeholder displayed in place of the item temporarily until at least a part of the item is received;

a mode selector responsive to a transfer rate value observed by the client program and indicative of a transfer rate at which the document is received from the server computer, the mode selector automatically selectively inhibiting display of the graphical image placeholder when the transfer rate value is faster than a predetermined minimum.

34. The computer system of claim 33 wherein the client computer is in communication with the computer network over a network link of an available bandwidth and the predetermined minimum is a predetermined minimum fraction of the bandwidth of the network link.

35. The computer system of claim 33 wherein the item embedded in the document is an image, the display dimensions of the image not determined until at least a portion of the image is received at the client application.

36. The computer system of claim 33 further comprising:
a mode selector automatically switching between a normal mode and a placeholder mode, the normal mode comprising inhibiting display of the placeholder, and the placeholder mode comprising displaying the placeholder within the document.

37. The computer system of claim 36, wherein the mode selector automatically switches between normal and placeholder mode based on a receive rate at which data is received at the client application as measured by the transfer rate measurer.

38. The computer system of claim 36 wherein the mode selector automatically switches into placeholder mode when the client application receives a request to view a certain portion of the document not displayed on the client display device, the certain portion comprising a reference to an item yet to be received by the client application.

* * * * *

UNITED STATES PATENT AND TRADEMARK OFFICE
CERTIFICATE OF CORRECTION

PATENT NO. : 5,845,084
DATED : December 1, 1998
INVENTOR(S) :
Cordell et al.

It is certified that error appears in the above-identified patent and that said Letters Patent is hereby corrected as shown below:

Col./Line
References Cited

Should Read
5,666,161 Kohiyama et al.
5,471,619 Messina
5,392,284 Sugiyama
5,317,732 Gerlach, Jr. et al.

James, Official Netscape Navigator 2.0 Book, Macintosh edition, Ventana Communications Group, pp. 21, 83, 85, 126, 276-278, 282, 284, 288, 343, 344, 346, 1996.

Chapter 5 - Navigating with Mosaic, pp. 86, 1995.

Internet explorer, pp. 59-60, 1995.

| Col./Line | | Should Read |
|---|---|---|
| 1/17 | is typically are | is typically |
| 7/33 | Mode | Mode (both occurrences) |
| 16/41 | claim 27 | claim 14 |
| 18/6 | claim 36 wherein | claim 36, wherein |

Signed and Sealed this

Fourteenth Day of March, 2000

Attest:

Q. TODD DICKINSON

*Attesting Officer*

*Commissioner of Patents and Trademarks*